US012056729B2

(12) United States Patent
Das et al.

(10) Patent No.: US 12,056,729 B2
(45) Date of Patent: *Aug. 6, 2024

(54) METHOD, SYSTEM, AND COMPUTER PROGRAM PRODUCT FOR APPLYING DEEP LEARNING ANALYSIS TO FINANCIAL DEVICE USAGE

(71) Applicant: Visa International Service Association, San Francisco, CA (US)

(72) Inventors: Mahashweta Das, Campbell, CA (US); Nikan Chavoshi, Santa Clara, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,145

(22) Filed: Nov. 21, 2022

(65) Prior Publication Data
US 2023/0092462 A1 Mar. 23, 2023

Related U.S. Application Data

(63) Continuation of application No. 16/971,737, filed as application No. PCT/US2018/019314 on Feb. 23, 2018, now Pat. No. 11,538,053.

(51) Int. Cl.
*G06Q 30/02* (2023.01)
*G06N 3/044* (2023.01)
(Continued)

(52) U.S. Cl.
CPC ......... *G06Q 30/0215* (2013.01); *G06N 3/044* (2023.01); *G06N 3/045* (2023.01);
(Continued)

(58) Field of Classification Search
None
See application file for complete search history.

(56) References Cited

U.S. PATENT DOCUMENTS 8,762,194 B2 6/2014 Rose et al.
10,313,342 B1 6/2019 Caldwell
(Continued)

FOREIGN PATENT DOCUMENTS

WO 02065246 A2 8/2002

*Primary Examiner* — David J Stoltenberg
(74) *Attorney, Agent, or Firm* — The Webb Law Firm

(57) ABSTRACT

Described are a system, method, and computer program product for applying deep learning analysis to predict and automatically respond to predicted changes in financial device primacy for a financial device holder. The method includes receiving transaction data representative of a plurality of transactions between the financial device holder and at least one merchant. The method also includes generating time series data based on the transaction data and generating a predictive model configured to: (i) receive an input of time-interval-based transaction data; and (ii) output a probability of primary financial device primacy change, the predictive model trained based on historic transaction data. The method further includes determining a probability of primary financial device primacy change for the financial device holder by applying the predictive model to the time series data. The method further includes, generating at least one communication to at least one issuer and/or the financial device holder.

20 Claims, 7 Drawing Sheets

(51) Int. Cl.
  *G06N 3/045*   (2023.01)
  *G06N 3/047*   (2023.01)
  *G06N 3/08*    (2023.01)
  *G06Q 30/016*  (2023.01)
  *G06Q 30/0207* (2023.01)
  *G06Q 40/02*   (2023.01)
  *G06Q 40/12*   (2023.01)

(52) U.S. Cl.
  CPC ............... *G06N 3/047* (2023.01); *G06N 3/08* (2013.01); *G06Q 30/016* (2013.01); *G06Q 40/02* (2013.01); *G06Q 40/12* (2013.12)

(56) References Cited

U.S. PATENT DOCUMENTS

| | | |
|---|---|---|
| 10,796,363 B1 | 10/2020 | Kim et al. |
| 10,891,628 B1 | 1/2021 | Flowers et al. |
| 10,891,647 B2 | 1/2021 | Gantert et al. |
| 10,937,027 B1 | 3/2021 | Sokol et al. |
| 2011/0125564 A1* | 5/2011 | DeLillio ............... G06Q 30/04 |
| | | 705/348 |
| 2011/0238550 A1 | 9/2011 | Reich et al. |
| 2011/0313900 A1 | 12/2011 | Falkenborg et al. |
| 2013/0054334 A1 | 2/2013 | Ross et al. |
| 2013/0226828 A1 | 8/2013 | Rose et al. |
| 2013/0226829 A1* | 8/2013 | Rose ....................... G06Q 40/00 |
| | | 705/36 R |
| 2014/0136353 A1 | 5/2014 | Goldman et al. |
| 2015/0012334 A1* | 1/2015 | Rose ....................... G06Q 40/06 |
| | | 705/7.31 |
| 2015/0058105 A1 | 2/2015 | Fonseca et al. |
| 2015/0081495 A1 | 3/2015 | Randall |
| 2016/0086222 A1 | 3/2016 | Kurapati |
| 2016/0232546 A1 | 8/2016 | Ranft et al. |
| 2017/0053336 A1 | 2/2017 | Barbour et al. |
| 2017/0083930 A1 | 3/2017 | Nagaraj et al. |
| 2017/0208370 A1 | 7/2017 | Ray et al. |
| 2017/0236215 A1 | 8/2017 | Eisen et al. |
| 2017/0323345 A1 | 11/2017 | Flowers et al. |
| 2017/0365000 A1* | 12/2017 | Wittkotter ............ G06F 16/2456 |
| 2018/0040064 A1* | 2/2018 | Grigg ..................... H04L 41/145 |
| 2018/0225667 A1 | 8/2018 | Wang et al. |
| 2018/0260697 A1 | 9/2018 | Sun et al. |
| 2019/0066110 A1 | 2/2019 | Shen et al. |
| 2019/0073669 A1 | 3/2019 | Dutta et al. |
| 2019/0139050 A1 | 5/2019 | Maheshwari |
| 2019/0180255 A1 | 6/2019 | Deshpande et al. |
| 2019/0228397 A1 | 7/2019 | Madden |
| 2019/0244203 A1 | 8/2019 | Phillips et al. |

\* cited by examiner

METHOD, SYSTEM, AND COMPUTER PROGRAM PRODUCT FOR APPLYING DEEP LEARNING ANALYSIS TO FINANCIAL DEVICE USAGE

CROSS-REFERENCE TO RELATED APPLICATIONS

This application is a continuation of U.S. patent application Ser. No. 16/971,737, having an effective filing date of Feb. 23, 2018, which is the United States national phase of International Application No. PCT/US2018/019314 filed Feb. 23, 2018, the disclosures of which are hereby incorporated by reference in their entireties.

BACKGROUND

1. Technical Field

Disclosed embodiments or aspects relate generally to a system, method, and computer program product for applying deep learning analysis to predict and automatically respond to predicted changes in financial device primacy for a financial device holder, and In some non-limiting embodiments or aspects, to a system, method, and computer program product for generating and applying a predictive model to generated time series data of transactions to predict financial device primacy changes and react accordingly.

2. Technical Considerations

Consumers use financial devices (e.g., credit cards, debit cards, etc.) to complete financial transactions with merchants. The financial device that a consumer is most likely to use to complete a given financial transaction may be referred to as a primary financial device, or with regard to the use of payment cards, a top-of-wallet (TOW) card. The market for financial devices, e.g., the payment card market, is incredibly competitive, and issuers actively compete for their respective financial device to have primacy. There are many possible factors for why a particular financial device may become a primary financial device, including financial device incentives (e.g., cashback/rewards programs), the reliability and convenience of fraud detection, and the availability of other financial devices. It is desirable for issuers to understand consumer habits for financial device usage in order to design targeted campaigns to increase market share in the financial device market. If an issuer can anticipate when a consumer will change their primary financial device, the issuer can offer rewards or perks to ensure the change occurs (if the current primary financial device is not associated with the issuer) or prevent the change from occurring (if the current primary financial device is associated with the issuer). However, it is difficult for an individual issuer to meaningfully interpret and predict consumer behavior when the information available to an issuer is largely limited to their own market share.

There is a need in the art to reliably predict consumer financial device usage and determine when a consumer is likely to change their primary financial device. There is a further need to make such predictions automatically and substantially in real-time, to allow for short response times to take action, and to trigger relevant, targeted communications.

SUMMARY

Accordingly, and generally, provided is an improved system, computer-implemented method, and computer program product for applying deep learning analysis to predict and automatically respond to predicted changes in financial device primacy for a financial device holder. Preferably, provided is an improved system, computer-implemented method, and computer program product for receiving transaction data representative of a plurality of transactions between the financial device holder and at least one merchant, and generating time series data based on the transaction data. Preferably, provided is an improved system, computer-implemented method, and computer program product for generating a predictive model configured to: (i) receive an input of time-interval-based transaction data; and (ii) output a probability of primary financial device primacy change. Preferably, provided is an improved system, computer-implemented method, and computer program product for determining a probability of primary financial device primacy change for the financial device holder by applying the predictive model to the time series data, and generating at least one communication to at least one issuer and/or the financial device holder.

According to some non-limiting embodiments or aspects, provided is a computer-implemented method for applying deep learning analysis to predict and automatically respond to predicted changes in financial device primacy for a financial device holder. The method includes receiving, with at least one processor, transaction data representative of a plurality of transactions between the financial device holder and at least one merchant over a first time interval. The method also includes generating, with at least one processor, time series data based on the transaction data. The time series data includes: (i) a plurality of subintervals over the first time interval; and (ii) a set of generated statistical parameters for each of the plurality of subintervals. The set of statistical parameters is based at least partially on at least one of the following: transaction count; transaction amount; transaction date; transaction day of week; transaction time of day; transaction merchant type; or any combination thereof. The method further includes generating, with at least one processor, a predictive model configured to: (i) receive an input of time-interval-based transaction data; and (ii) output a probability of primary financial device primacy change, the predictive model trained based on historic transaction data. The method further includes determining, with at least one processor, a probability of primary financial device primacy change for the financial device holder by applying the predictive model to the time series data. The method further includes, in response to determining that the probability of primary financial device primacy change satisfies a threshold, generating, with at least one processor and based at least partially on the probability of primary financial device primacy change for the financial device holder, at least one communication to at least one issuer and/or the financial device holder.

In some non-limiting embodiments or aspects, the method may include determining, with at least one processor, one or more applicable issuer promotions for a current primary financial device of the financial device holder by retrieving issuer promotion data from an issuer promotion database. The method may also include transmitting, with at least one processor, the at least one communication to the financial device holder. The at least one communication may include the one or more applicable issuer promotions for the current primary financial device to discourage the financial device holder from changing their primary financial device.

In some non-limiting embodiments or aspects, the method may include receiving, with at least one processor, new transaction data representative of a plurality of transactions between the financial device holder and the at least one merchant over a second time interval. The method may also include generating, with at least one processor, new time series data based on the new transaction data. The new time series data may include a plurality of subintervals over the second time interval. The method may further include determining, with at least one processor, a new probability of primary financial device primacy change for the financial device holder by applying the predictive model to the new time series data and based at least partially on at least one prior probability prediction determined from application of the predictive model to prior-generated time series data. The method may further include transmitting, with at least one processor and based at least partially on the new probability of primary financial device primacy change for the financial device holder, at least one of the following: (i) the at least one communication to the at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

In some non-limiting embodiments or aspects, the method may include updating the predictive model based at least partially on the new transaction data. Financial device data of a current primary financial device of the financial device holder for the first time interval may be stored in a database in association with issuer correspondence data. The method may also include transmitting, with at least one processor and based at least partially on the issuer correspondence data, the at least one communication to the at least one issuer. The at least one issuer may include an issuer of the current primary financial device, and the at least one communication may indicate that the financial device holder is likely to have a new primary financial device in a subsequent time interval. The at least one issuer may also include an issuer of a non-primary financial device, and the at least one communication may indicate that the financial device holder may have a new primary financial device in a subsequent time interval, in response to determining that the probability of primary financial device primacy change for the financial device holder is more likely than not.

In some non-limiting embodiments or aspects, financial device data of a current primary financial device of the financial device holder for the first time interval may be stored in a database in association with financial device holder correspondence data. The method may include, in response to detecting a transaction request for the primary financial device, transmitting, with at least one processor and based at least partially on the financial device holder correspondence data, the at least one communication to the financial device holder. The at least one communication may include an offer or reward. Primary financial device primacy may be defined by the ratio of the number of transactions for a given financial device over the total number of transactions for a financial device holder being greater than or equal to a predefined value greater than 0.6.

According to some non-limiting embodiments or aspects, provided is a system for applying deep learning analysis to predict and automatically respond to predicted changes in financial device primacy for a financial device holder. The system includes at least one server computer including at least one processor. The at least one server computer is programmed and/or configured to receive transaction data representative of a plurality of transactions between the financial device holder and at least one merchant over a first time interval. The server computer is also programmed and/or configured to generate time series data based on the transaction data. The time series data includes: (i) a plurality of subintervals over the first time interval; and (ii) a set of generated statistical parameters for each of the plurality of subintervals. The set of statistical parameters is based at least partially on at least one of the following: transaction count; transaction amount; transaction date; transaction day of week; transaction time of day; transaction merchant type; or any combination thereof. The server computer is further programmed and/or configured to generate a predictive model configured to: (i) receive an input of time-interval-based transaction data; and (ii) output a probability of primary financial device primacy change. The predictive model is trained based on historic transaction data. The server computer is further programmed and/or configured to determine a probability of primary financial device primacy change for the financial device holder by applying the predictive model to the time series data. The server computer is further programmed and/or configured to, in response to determining that the probability of primary financial device primacy change satisfies a threshold, generate, based at least partially on the probability of primary financial device primacy change for the financial device holder, at least one communication to at least one issuer and/or the financial device holder.

In some non-limiting embodiments or aspects, the at least one server computer may be programmed and/or configured to determine one or more applicable issuer promotions for a current primary financial device of the financial device holder by retrieving issuer promotion data from an issuer promotion database. The at least one server computer may also be programmed and/or configured to transmit the at least one communication to the financial device holder, the at least one communication including the one or more applicable issuer promotions for the current primary financial device to discourage the financial device holder from changing their primary financial device.

In some non-limiting embodiments or aspects, the at least one server computer may be programmed and/or configured to receive new transaction data representative of a plurality of transactions between the financial device holder and the at least one merchant over a second time interval. The at least one server computer may also be programmed and/or configured to generate new time series data based on the new transaction data. The new time series data may include a plurality of subintervals over the second time interval. The at least one server computer may further be programmed and/or configured to determine a new probability of primary financial device primacy change for the financial device holder by applying the predictive model to the new time series data and based at least partially on at least one prior probability prediction determined from application of the predictive model to prior-generated time series data. The at least one server computer may further be programmed and/or configured to transmit, based at least partially on the new probability of primary financial device primacy change for the financial device holder, at least one of the following: (i) the at least one communication to the at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

In some non-limiting embodiments or aspects, the at least one server computer may be programmed and/or configured to update the predictive model based at least partially on the new transaction data. Financial device data of a current primary financial device of the financial device holder for the first time interval may be stored in a database in association with issuer correspondence data. The at least one server computer may also be programmed and/or configured to transmit, based at least partially on the issuer correspondence data, the at least one communication to the at least one issuer. The at least one issuer may include an issuer of the current primary financial device, and the at least one communication indicating that the financial device holder is likely to have a new primary financial device in a subsequent time interval. The at least one issuer may also include an issuer of a non-primary financial device, and the at least one communication may indicate that the financial device holder may have a new primary financial device in a subsequent time interval, in response to determining that the probability of primary financial device primacy change for the financial device holder is more likely than not.

In some non-limiting embodiments or aspects, financial device data of a current primary financial device of the financial device holder for the first time interval may be stored in a database in association with financial device holder correspondence data. The at least one server computer may be programmed and/or configured to, in response to detecting a transaction request for the primary financial device, transmit, based at least partially on the financial device holder correspondence data, the at least one communication to the financial device holder, the at least one communication including an offer or reward. Primary financial device primacy may be defined by the ratio of the number of transactions for a given financial device over the total number of transactions for a financial device holder being greater than or equal to a predefined value greater than 0.6.

According some non-limiting embodiments or aspects, provided is a computer program product for applying deep learning analysis to predict and automatically respond to predicted changes in financial device primacy for a financial device holder. The computer program product includes at least one non-transitory computer-readable medium including program instructions that, when executed by at least one processor, cause the at least one processor to receive transaction data representative of a plurality of transactions between the financial device holder and at least one merchant over a first time interval. The program instructions are also programmed and/or configured to cause the at least one processor to generate time series data based on the transaction data. The time series data includes: (i) a plurality of subintervals over the first time interval; and (ii) a set of generated statistical parameters for each of the plurality of subintervals. The set of statistical parameters are based at least partially on at least one of the following: transaction count; transaction amount; transaction date; transaction day of week; transaction time of day; transaction merchant type; or any combination thereof. The program instructions are further programmed and/or configured to cause the at least one processor to generate a predictive model configured to: (i) receive an input of time-interval-based transaction data; and (ii) output a probability of primary financial device primacy change, the predictive model trained based on historic transaction data. The program instructions are further programmed and/or configured to cause the at least one processor to determine a probability of primary financial device primacy change for the financial device holder by applying the predictive model to the time series data. The program instructions are programmed and/or configured to cause the at least one processor to, in response to determining that the probability of primary financial device primacy change satisfies a threshold, generate, based at least partially on the probability of primary financial device primacy change for the financial device holder, at least one communication to at least one issuer and/or the financial device holder.

In some non-limiting embodiments or aspects, the program instructions may be programmed and/or configured to cause the at least one processor to determine one or more applicable issuer promotions for a current primary financial device of the financial device holder by retrieving issuer promotion data from an issuer promotion database. The program instructions may also be programmed and/or configured to cause the at least one processor to transmit the at least one communication to the financial device holder. The at least one communication may include the one or more applicable issuer promotions for the current primary financial device to discourage the financial device holder from changing their primary financial device.

In some non-limiting embodiments or aspects, the program instructions may be programmed and/or configured to cause the at least one processor to receive new transaction data representative of a plurality of transactions between the financial device holder and the at least one merchant over a second time interval. The program instructions may also be programmed and/or configured to cause the at least one processor to generate new time series data based on the new transaction data. The new time series data may include a plurality of subintervals over the second time interval. The program instructions may further be programmed and/or configured to cause the at least one processor to determine a new probability of primary financial device primacy change for the financial device holder by applying the predictive model to the new time series data and based at least partially on at least one prior probability prediction determined from application of the predictive model to prior-generated time series data. The program instructions may also be programmed and/or configured to cause the at least one processor to transmit, based at least partially on the new probability of primary financial device primacy change for the financial device holder, at least one of the following: (i) the at least one communication to the at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

In some non-limiting embodiments or aspects, the program instructions may be programmed and/or configured to cause the at least one processor to update the predictive model based at least partially on the new transaction data. Financial device data of a current primary financial device of the financial device holder for the first time interval may be stored in a database in association with issuer correspondence data. The program instructions may also be programmed and/or configured to cause the at least one processor to transmit, based at least partially on the issuer correspondence data, the at least one communication to the at least one issuer. The at least one issuer may include an issuer of the current primary financial device, and the at least one communication may indicate that the financial device holder is likely to have a new primary financial device in a subsequent time interval. The at least one issuer may include an issuer of a non-primary financial device, and the at least one communication may indicate that the financial device holder may have a new primary financial device in a subsequent time interval, in response to determining that the probability of primary financial device primacy change for the financial device holder is more likely than not.

In some non-limiting embodiments or aspects, financial device data of a current primary financial device of the financial device holder for the first time interval may be stored in a database in association with financial device holder correspondence data. The program instructions may be programmed and/or configured to cause the at least one processor to, in response to detecting a transaction request for the primary financial device, transmit, based at least partially on the financial device holder correspondence data, the at least one communication to the financial device holder, the at least one communication including an offer or reward. Primary financial device primacy may be defined by the ratio of the number of transactions for a given financial device over the total number of transactions for a financial device holder being greater than or equal to a predefined value greater than 0.6.

Further non-limiting embodiments or aspects of the present disclosure are set forth in the following numbered clauses:

Clause 1: A computer-implemented method for applying deep learning analysis to predict and automatically respond to predicted changes in financial device primacy for a financial device holder, the method comprising: receiving, with at least one processor, transaction data representative of a plurality of transactions between the financial device holder and at least one merchant over a first time interval; generating, with at least one processor, time series data based on the transaction data, the time series data comprising: (i) a plurality of subintervals over the first time interval; and (ii) a set of generated statistical parameters for each of the plurality of subintervals, the set of statistical parameters based at least partially on at least one of the following: transaction count; transaction amount; transaction date; transaction day of week; transaction time of day; transaction merchant type; or any combination thereof; generating, with at least one processor, a predictive model configured to: (i) receive an input of time-interval-based transaction data; and (ii) output a probability of primary financial device primacy change, the predictive model trained based on historic transaction data; determining, with at least one processor, a probability of primary financial device primacy change for the financial device holder by applying the predictive model to the time series data; and in response to determining that the probability of primary financial device primacy change satisfies a threshold, generating, with at least one processor and based at least partially on the probability of primary financial device primacy change for the financial device holder, at least one communication to at least one issuer and/or the financial device holder.

Clause 2: The method of clause 1, further comprising: determining, with at least one processor, one or more applicable issuer promotions for a current primary financial device of the financial device holder by retrieving issuer promotion data from an issuer promotion database; and transmitting, with at least one processor, the at least one communication to the financial device holder, the at least one communication comprising the one or more applicable issuer promotions for the current primary financial device to discourage the financial device holder from changing their primary financial device.

Clause 3: The method of clause 1 or clause 2, further comprising: receiving, with at least one processor, new transaction data representative of a plurality of transactions between the financial device holder and the at least one merchant over a second time interval; generating, with at least one processor, new time series data based on the new transaction data, the new time series data comprising a plurality of subintervals over the second time interval; determining, with at least one processor, a new probability of primary financial device primacy change for the financial device holder by applying the predictive model to the new time series data and based at least partially on at least one prior probability prediction determined from application of the predictive model to prior-generated time series data; and transmitting, with at least one processor and based at least partially on the new probability of primary financial device primacy change for the financial device holder, at least one of the following: (i) the at least one communication to the at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

Clause 4: The method of any of clauses 1-3, further comprising updating the predictive model based at least partially on the new transaction data.

Clause 5: The method of any of clauses 1-4, wherein financial device data of a current primary financial device of the financial device holder for the first time interval is stored in a database in association with issuer correspondence data.

Clause 6: The method of any of clauses 1-5, further comprising transmitting, with at least one processor and based at least partially on the issuer correspondence data, the at least one communication to the at least one issuer, the at least one issuer comprising an issuer of the current primary financial device, and the at least one communication indicating that the financial device holder is likely to have a new primary financial device in a subsequent time interval.

Clause 7: The method of any of clauses 1-6, further comprising transmitting, with at least one processor and based at least partially on the issuer correspondence data, the at least one communication to the at least one issuer, the at least one issuer comprising an issuer of a non-primary financial device, and the at least one communication indicating that the financial device holder may have a new primary financial device in a subsequent time interval, in response to determining that the probability of primary financial device primacy change for the financial device holder is more likely than not.

Clause 8: The method of any of clauses 1-7, wherein financial device data of a current primary financial device of the financial device holder for the first time interval is stored in a database in association with financial device holder correspondence data.

Clause 9: The method of any of clauses 1-8, further comprising, in response to detecting a transaction request for the primary financial device, transmitting, with at least one processor and based at least partially on the financial device holder correspondence data, the at least one communication to the financial device holder, the at least one communication comprising an offer or reward.

Clause 10: The method of any of clauses 1-9, wherein primary financial device primacy is defined by the ratio of the number of transactions for a given financial device over the total number of transactions for a financial device holder being greater than or equal to a predefined value greater than 0.6.

Clause 11: A system for applying deep learning analysis to predict and automatically respond to predicted changes in financial device primacy for a financial device holder, the system comprising at least one server computer including at least one processor, the at least one server computer programmed and/or configured to: receive transaction data representative of a plurality of transactions between the financial device holder and at least one merchant over a first time interval; generate time series data based on the transaction data, the time series data comprising: (i) a plurality of subintervals over the first time interval; and (ii) a set of generated statistical parameters for each of the plurality of subintervals, the set of statistical parameters based at least partially on at least one of the following: transaction count, transaction amount, transaction date, transaction day of week, transaction time of day, transaction merchant type, or any combination thereof; generate a predictive model configured to: (i) receive an input of time-interval-based transaction data; and (ii) output a probability of primary financial device primacy change, the predictive model trained based on historic transaction data; determine a probability of primary financial device primacy change for the financial device holder by applying the predictive model to the time series data; and in response to determining that the probability of primary financial device primacy change satisfies a threshold, generate, based at least partially on the probability of primary financial device primacy change for the financial device holder, at least one communication to at least one issuer and/or the financial device holder.

Clause 12: The system of clause 11, the at least one server computer further programmed and/or configured to: determine one or more applicable issuer promotions for a current primary financial device of the financial device holder by retrieving issuer promotion data from an issuer promotion database; and transmit the at least one communication to the financial device holder, the at least one communication comprising the one or more applicable issuer promotions for the current primary financial device to discourage the financial device holder from changing their primary financial device.

Clause 13: The system of clause 11 or clause 12, the at least one server computer further programmed and/or configured to: receive new transaction data representative of a plurality of transactions between the financial device holder and the at least one merchant over a second time interval; generate new time series data based on the new transaction data, the new time series data comprising a plurality of subintervals over the second time interval; determine a new probability of primary financial device primacy change for the financial device holder by applying the predictive model to the new time series data and based at least partially on at least one prior probability prediction determined from application of the predictive model to prior-generated time series data; and transmit, based at least partially on the new probability of primary financial device primacy change for the financial device holder, at least one of the following: (i) the at least one communication to the at least one issuer indicating a likelihood of the financial device holder changing their primary financial device; (ii) the at least one communication to the financial device holder to discourage the financial device holder from changing their primary financial device or encourage the financial device holder to change their primary financial device, or (iii) any combination thereof.

Clause 14: The system of any of clauses 11-13, the at least one server computer further programmed and/or configured to update the predictive model based at least partially on the new transaction data.

Clause 15: The system of any of clauses 11-14, wherein financial device data of a current primary financial device of the financial device holder for the first time interval is stored in a database in association with issuer correspondence data.

Clause 16: The system of any of clauses 11-15, the at least one server computer further programmed and/or configured to transmit, based at least partially on the issuer correspondence data, the at least one communication to the at least one issuer, the at least one issuer comprising an issuer of the current primary financial device, and the at least one communication indicating that the financial device holder is likely to have a new primary financial device in a subsequent time interval.

Clause 17: The system of any of clauses 11-16, the at least one server computer further programmed and/or configured to transmit, based at least partially on the issuer correspondence data, the at least one communication to the at least one issuer, the at least one issuer comprising an issuer of a non-primary financial device, and the at least one communication indicating that the financial device holder may have a new primary financial device in a subsequent time interval, in response to determining that the probability of primary financial device primacy change for the financial device holder is more likely than not.

Clause 18: The system of any of clauses 11-17, wherein financial device data of a current primary financial device of the financial device holder for the first time interval is stored in a database in association with financial device holder correspondence data.

Clause 19: The method of any of clauses 11-18, the at least one server computer further programmed and/or configured to, in response to detecting a transaction request for the primary financial device, transmit, based at least partially on the financial device holder correspondence data, the at least one communication to the financial device holder, the at least one communication comprising an offer or reward.

Clause 20: The method of any of clauses 11-19, wherein primary financial device primacy is defined by the ratio of the number of transactions for a given financial device over the total number of transactions for a financial device holder being greater than or equal to a predefined value greater than 0.6.

Clause 21: A computer program product for applying deep learning analysis to predict and automatically respond to predicted changes in financial device primacy for a financial device holder, the computer program product comprising at least one non-transitory computer-readable medium including program instructions that, when executed by at least one processor, cause the at least one processor to: receive transaction data representative of a plurality of transactions between the financial device holder and at least one merchant over a first time interval; generate time series data based on the transaction data, the time series data comprising: (i) a plurality of subintervals over the first time interval; and (ii) a set of generated statistical parameters for each of the plurality of subintervals, the set of statistical parameters based at least partially on at least one of the following: transaction count; transaction amount; transaction date; transaction day of week; transaction time of day; transaction merchant type; or any combination thereof; generate a predictive model configured to: (i) receive an input of time-interval-based transaction data; and (ii) output a probability of primary financial device primacy change, the predictive model trained based on historic transaction data; determine a probability of primary financial device primacy change for the financial device holder by applying the predictive model to the time series data; and in response to determining that the probability of primary financial device primacy change satisfies a threshold, generate, based at least partially on the probability of primary financial device primacy change for the financial device holder, at least one communication to at least one issuer and/or the financial device holder.

Clause 22: The computer program product of clause 21, the program instructions being further programmed and/or configured to cause the at least one processor to: determine one or more applicable issuer promotions for a current primary financial device of the financial device holder by retrieving issuer promotion data from an issuer promotion database; and transmit the at least one communication to the financial device holder, the at least one communication comprising the one or more applicable issuer promotions for the current primary financial device to discourage the financial device holder from changing their primary financial device.

Clause 23: The computer program product of clause 21 or clause 22, the program instructions being further programmed and/or configured to cause the at least one processor to: receive new transaction data representative of a plurality of transactions between the financial device holder and the at least one merchant over a second time interval; generate new time series data based on the new transaction data, the new time series data comprising a plurality of subintervals over the second time interval; determine a new probability of primary financial device primacy change for the financial device holder by applying the predictive model to the new time series data and based at least partially on at least one prior probability prediction determined from application of the predictive model to prior-generated time series data; and transmit, based at least partially on the new probability of primary financial device primacy change for the financial device holder, at least one of the following: (i) the at least one communication to the at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

Clause 24: The computer program product of any of clauses 21-23, the program instructions being further programmed and/or configured to cause the at least one processor to update the predictive model based at least partially on the new transaction data.

Clause 25: The computer program product of any of clauses 21-24, wherein financial device data of a current primary financial device of the financial device holder for the first time interval is stored in a database in association with issuer correspondence data.

Clause 26: The computer program product of any of clauses 21-25, the program instructions being further programmed and/or configured to cause the at least one processor to transmit, based at least partially on the issuer correspondence data, the at least one communication to the at least one issuer, the at least one issuer comprising an issuer of the current primary financial device, and the at least one communication indicating that the financial device holder is likely to have a new primary financial device in a subsequent time interval.

Clause 27: The computer program product of any of clauses 21-26, the program instructions being further programmed and/or configured to cause the at least one processor to transmit, based at least partially on the issuer correspondence data, the at least one communication to the at least one issuer, the at least one issuer comprising an issuer of a non-primary financial device, and the at least one communication indicating that the financial device holder may have a new primary financial device in a subsequent time interval, in response to determining that the probability of primary financial device primacy change for the financial device holder is more likely than not.

Clause 28: The computer program product of any of clauses 21-27, wherein financial device data of a current primary financial device of the financial device holder for the first time interval is stored in a database in association with financial device holder correspondence data.

Clause 29: The computer program product of any of clauses 21-28, the program instructions being further programmed and/or configured to cause the at least one processor to, in response to detecting a transaction request for the primary financial device, transmit, based at least partially on the financial device holder correspondence data, the at least one communication to the financial device holder, the at least one communication comprising an offer or reward.

Clause 30: The computer program product of any of clauses 21-29, wherein primary financial device primacy is defined by the ratio of the number of transactions for a given financial device over the total number of transactions for a financial device holder being greater than or equal to a predefined value greater than 0.6.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying figures, in which.

DETAILED DESCRIPTION

Figure 1:
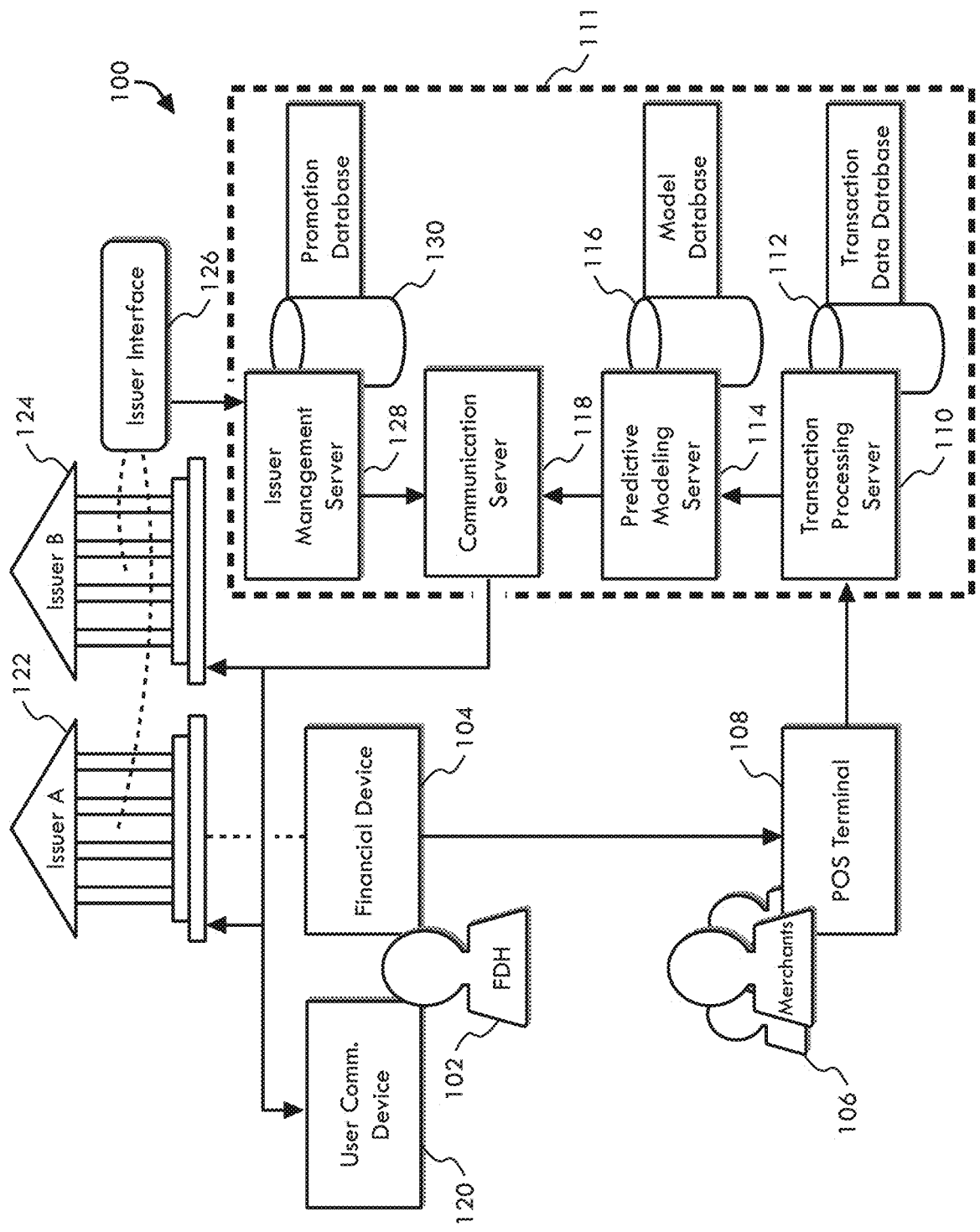
FIG. 1 is a schematic diagram of one non-limiting embodiment or aspect of a system and method for applying deep learning analysis to predict and automatically respond to predicted changes in financial device primacy for a financial device holder.

For purposes of the description hereinafter, the terms "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "account identifier" may include one or more Primary Account Numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "financial device" may refer to a portable payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a PDA, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

As used herein, the term "primacy" may refer to favoring a particular financial device as a primary financial device for completing financial transactions. If a user has more than one financial device, a financial device that has primacy may be considered to be used by the user more often than the other alternative financial devices. If a user only has one financial device, that financial device may be said to have primacy. If all financial devices of a user are used relatively equally, it may be said that no financial device of the user has primacy. As used herein, the term "primacy change" or "change in primacy" may refer to one or more of the following conditions: a user having a financial device with primacy in a first time no longer has a financial device with primacy in a second time; a user having no financial device with primacy in a first time has a financial device with primacy in a second time; or, a user having a financial device with primacy in a first time has a different financial device with primacy in a second time. A lack of primacy change, or a lack of change in primacy, may refer to one or more of the following conditions: a user having a financial device with primacy in a first time has the same financial device with primacy in a second time; or, a user having no financial device with primacy in a first time continues to have no financial device with primacy in a second time. A change in primacy may be due to removing a financial device from use or adding a financial device to use for a user. A financial device that has primacy as the default financial device in an electronic wallet (or e-wallet) or physical wallet may be referred to as "top-of-wallet" (TOW).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "account data," as used herein, refers to any data concerning one or more accounts for one or more users. Account data may include, for example, one or more account identifiers, user identifiers, transaction histories, balances, credit limits, issuer institution identifiers, and/or the like.

In non-limiting embodiments or aspects of the present disclosure, provided is a unique system architecture to analyze consumer behavior in real-time as transactions are occurring and being processed by a transaction service provider. By basing such an analysis of consumer behavior on ongoing transaction data, and by leveraging the processing position of the transaction service provider, the described non-limiting embodiments or aspects provide the benefit of reducing time delays and costs associated with traditional methods of surveys or qualitative analysis. Individual issuers that lack the infrastructure or market share to derive meaningful data from post-processed transaction data can leverage the much greater market share of a transaction service provider to analyze a much wider sample of consumers. Furthermore, by using deep learning techniques and neural networks as a basis for a predictive model, non-limiting embodiments or aspects of the system may anticipate changes in primary financial devices before they occur, which provides significant cost and time savings over pure reactionary systems. Additionally, probabilities that are output from the predictive model may be compared to actual changes in primacy as they occur, as a means of ongoing error correction, which provides the benefit of recursive and iterative improvement to the underlying model. This allows the computer system to self-improve as more transaction data is collected for consumers over time. Moreover, non-limiting embodiments or aspects directed to communicating automatic notifications and promotions/offers to user devices provide an improvement to e-wallet technology.

With specific reference to FIG. 1, and in some non-limiting embodiments or aspects of the disclosure, provided is a system 100 for applying deep learning analysis to predict and automatically respond to predicted changes in financial device primacy for a financial device holder. In particular, a financial device holder 102 may have one or more financial devices 104 that may be used to complete financial transactions with one or more merchants 106. A given financial device 104 may be used at a merchant POS terminal 108, which is configured to transmit a transaction authorization request to a transaction processing server 110. The transaction processing server 110 may be associated with a transaction service provider 111. The authorization request includes transaction data, which may include, but is not limited to, transaction amount, transaction description, transaction time, transaction date, financial device data, financial device holder data, transaction location, merchant identifier, merchant type, financial device issuer, acquirer for merchant account, and/or the like. The transaction data may be stored in a transaction data database 112 that is communicatively connected to the transaction processing server 110. The transaction processing server 110 may act as a transaction handler positioned between an issuer processor and an acquirer processor to complete the transaction as a credit from the financial device holder's account to the merchant's account. It will be appreciated that many configurations are possible.

With further reference to FIG. 1, and in some non-limiting embodiments or aspects of the disclosure, the system also may include a predictive modeling server 114 configured to generate a predictive model for predicting changes in financial device primacy for one or more financial device holders 102. The predictive modeling server 114 may be the same server as the transaction processing server 110. The predictive modeling server 114 may be configured to generate time series data based on the transaction data received over a first time interval (e.g., one week, one month, and/or the like). The transaction data is collected from a plurality of transactions between a financial device holder 102 and one or more merchants 106. The time series data may be divided into a plurality of subintervals (e.g., days, weeks, and/or the like). For each subinterval, the time series data may include a set of statistical parameters for each subinterval that are based on the transaction data, including, but not limited to, number of transactions per subinterval, number of transactions on weekdays per subinterval, number of transactions on weekends per subinterval, number of transactions during night per subinterval, number of transactions during morning per subinterval, number of transactions during afternoon per subinterval, number of transactions during evening per subinterval, total amount of transactions per subinterval, average (e.g., statistical mean, median, mode) transaction amount per subinterval, count or amount of transactions with merchants in a designated merchant category, and/or the like. The set of statistical parameters for each subinterval may be concatenated to form a data map of vectors of parameters representing the entire sample time interval. It will be appreciated that many configurations are possible.

With further reference to FIG. 1, and in some non-limiting embodiments or aspects of the disclosure, the predictive modeling server 114 may output a probability of financial device primacy change for one or more financial device holders 102. This probability may be compared to a predetermined threshold, such as p>0.50, p≥ 0.60, p≥0.70, and/or the like. Based on this comparison, if the probability of financial device primacy change for a financial device holder meets and/or exceeds the predetermined threshold, a communication server 118 may generate and transmit a communication to the financial device holder 102, to an issuer of the primary financial device 122, or to an issuer of a non-primary financial device 124. A financial device holder 102 may receive the communication via a user communication device 120, e.g., a mobile device. The communication server 118 may be the same server as the predictive modeling server 114 and/or the transaction processing server 110. A communication to a financial device holder 102 may include an offer/reward to encourage the user to change their primary financial device, or to discourage the user from changing their primary financial device. A communication to an issuer of the primary financial device 122 may include an alert that the financial device holder 102 is likely to change their primary financial device, to allow the primary financial device issuer 122 to encourage the financial device holder 102 to maintain their primary financial device. A communication to an issuer of a non-primary financial device 124 may include an alert that the financial device holder 102 is likely to change their primary financial device, to allow the non-primary financial device issuer 124 to encourage the financial device holder 102 to switch their primary financial device. It will be appreciated that many configurations are possible.

With further reference to FIG. 1, and in some non-limiting embodiments or aspects of the disclosure, the system may further include an issuer interface 126, e.g., a web portal, an application programming interface (API), an app, and/or the like, to allow issuers 122, 124 to communicate with an issuer management server 128, to edit and store issuer promotion data in a promotion database 130. Issuer interfaces 126 may also be the means of receiving communications from the communication server 118. The issuer management server 128 may be the same server as the communication server 118, predictive modeling server 114, and/or the transaction processing server 110. These servers 110, 114, 118, 128 and their associated databases 112, 116, 130 may be associated with and/or managed by the transaction service provider 111. Before issuing a communication to a financial device holder 102 based on a likelihood of financial device primacy change, the issuer management server 128 may determine one or more applicable issuer promotions for the financial device holder 102 by retrieving issuer promotion data from the promotion database 130. Based on preset offer campaigns, rewards campaigns, rebate campaigns, and/or the like, the communication to the financial device holder 102 may include one or more applicable issuer promotions to encourage or discourage the financial device holder 102 from changing their primary financial device. For example, when a transaction request is being processed for a primary financial device, the financial device holder 102 of which being likely to change their primary financial device, the issuer management server 128 may identify a promotional offer applicable to the purchase and transmit a communication to a communication device 120 of the financial device holder 102 to reinforce the purchase behavior. It will be appreciated that the depicted system may continually receive new transaction data, generate new time series data, determine new probabilities of primary financial device primacy change, and generate and transmit new communications. It will be appreciated that many configurations are possible.

Figure 2:
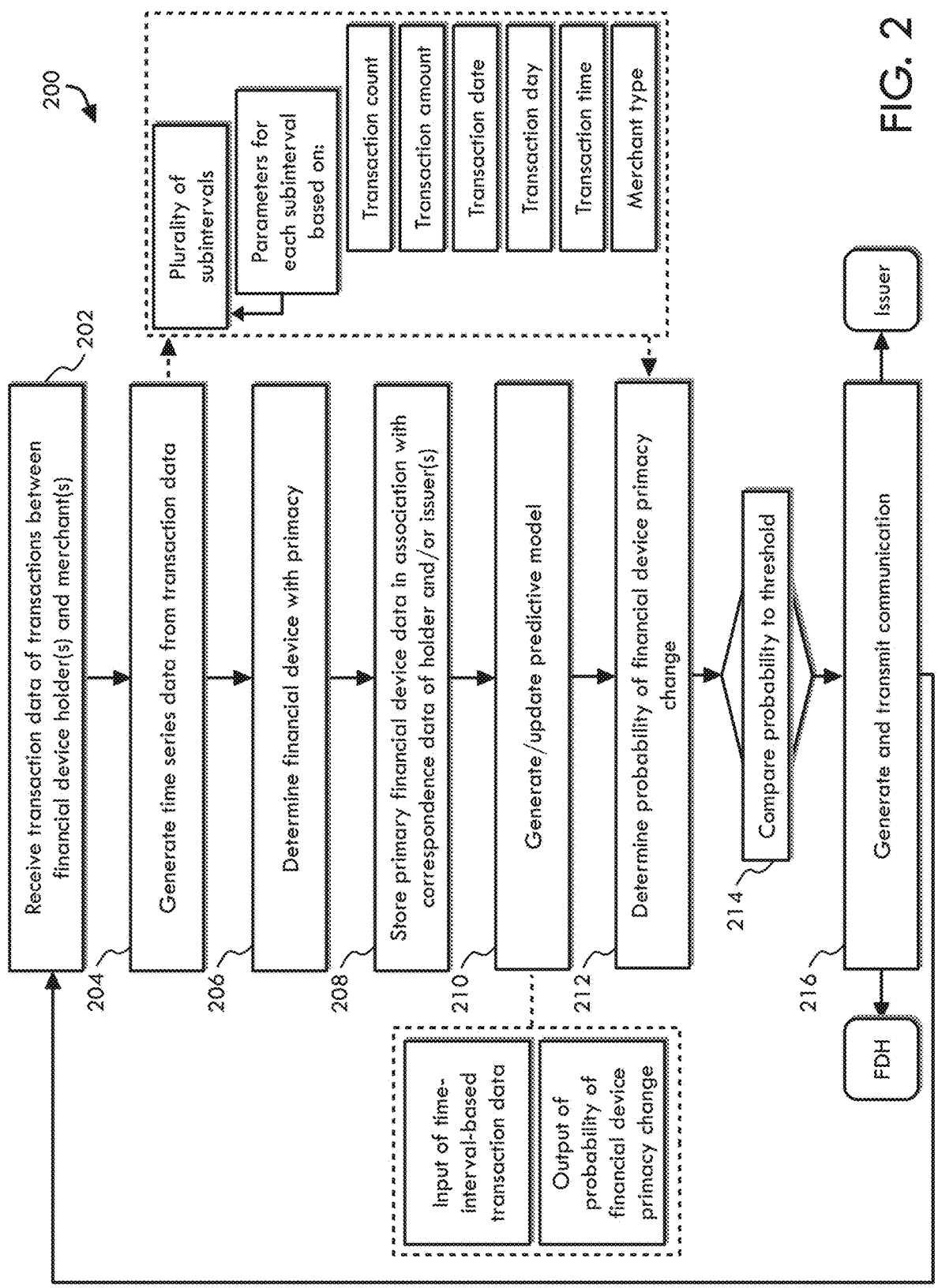
FIG. 2 is a flow diagram of one non-limiting embodiment or aspect of a system and method for applying deep learning analysis to predict and automatically respond to predicted changes in financial device primacy for a financial device holder.

With specific reference to FIG. 2, and in some non-limiting embodiments or aspects of the disclosure, provided is a method 200 for applying deep learning analysis to predict and automatically respond to predicted changes in financial device primacy for a financial device holder. The method 200 may be carried out by one or more servers in the non-limiting exemplary system of FIG. 1. For ease of reference in describing the method 200, they may be individually or collectively referred to as "the processor" herein below. At step 202, the processor receives transaction data representative of a plurality of transactions between a given financial device holder and at least one merchant over a first time interval. At step 204, the processor generates time series data based on the transaction data. The time series data may include a plurality of subintervals over the first time interval and a set of generated statistical parameters for each of the plurality of subintervals. At step 206, based on the transaction data, the processor may determine a financial device with primacy. This primary financial device may be automatically determined as a financial device that is used in more transactions than other financial devices. It may also be determined as a financial device that is used for a greater volume of transaction value than other financial devices. It may also be determined as a financial device that is used for a number of transactions that meet or exceed a target threshold, such as 50%, 60%, or 70% of total transactions. It will be appreciated that many configurations are possible.

With further reference to FIG. 2, and in some non-limiting embodiments or aspects of the disclosure, at step 208, the primary financial device data may be stored in association with correspondence data (e.g., email address, phone number, user ID, etc.) of the financial device holder and/or an issuer, such as the issuer of the primary financial device, or an issuer of another financial device of the financial device holder. At step 210, the processor may generate a predictive model configured to receive an input of time-interval-based transaction data and to output a probability of primary financial device primacy change. The predictive model may be trained based on historic transaction data. At step 212, the processor may determine a probability of primary financial device primacy change for the financial device holder by applying the predictive model to the time series data generated from the collected transaction data. At step 214, this probability may be compared to a predetermined threshold. If the probability satisfies the threshold (e.g., meets and/or passes the threshold), the processor may generate and transmit a communication to the financial device holder and/or an issuer, at step 216. After steps 212, 214, and/or 216, the processor may return to step 202 to receive new transaction data from a subsequent (e.g., second, third, fourth, etc.) time interval. Subsequently, step 204 may be repeated to generate new time series data, step 212 may be repeated to determine a new probability of primary financial device primacy change, and step 216 may be repeated to send new communications. It will be appreciated that many configurations are possible.

Figure 3:
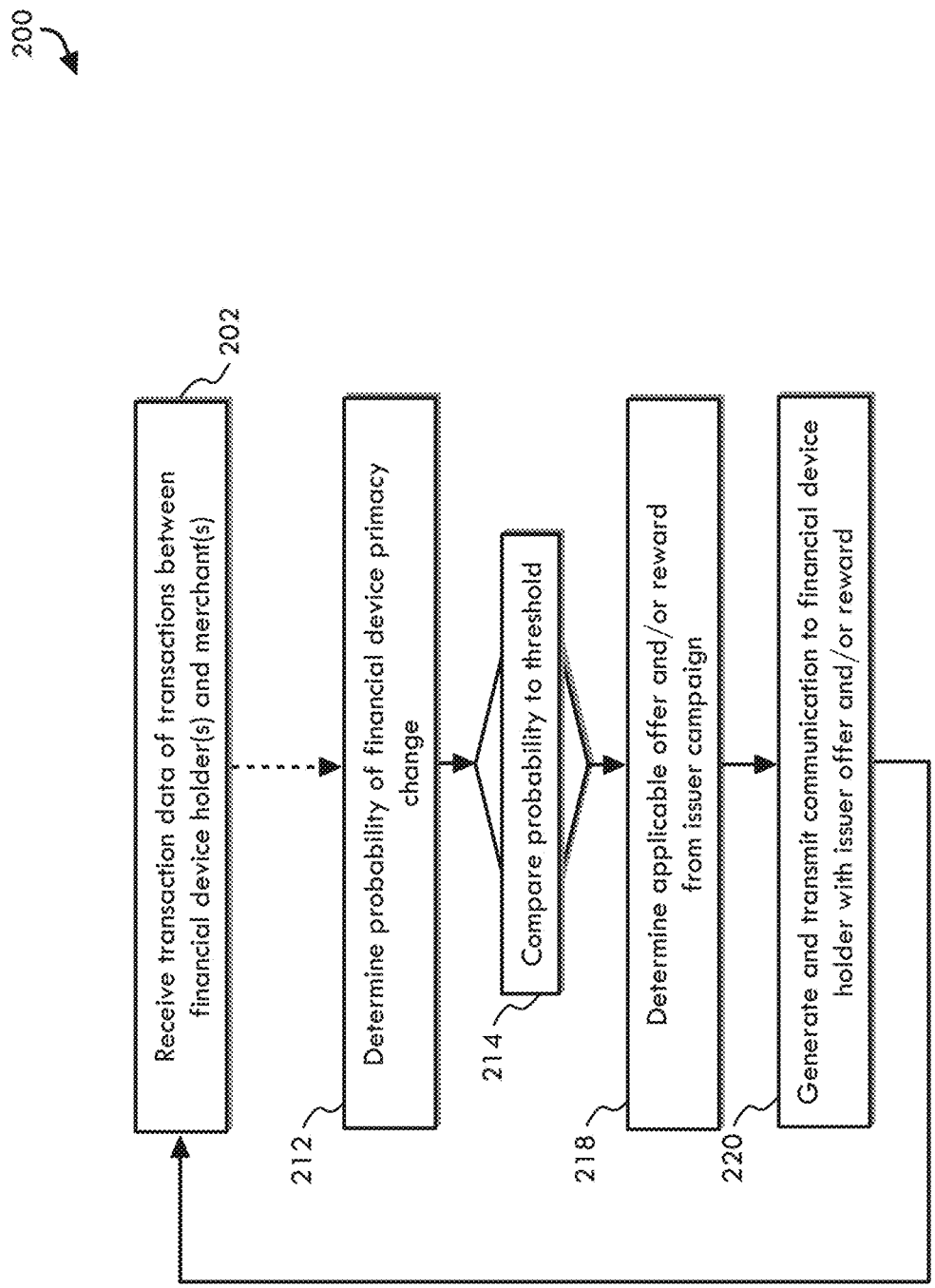
FIG. 3 is a flow diagram of one non-limiting embodiment or aspect of a system and method for applying deep learning analysis to predict and automatically respond to predicted changes in financial device primacy for a financial device holder.

With specific reference to FIGS. 2 and 3, and in particular reference to FIG. 3, in some non-limiting embodiments or aspects of the disclosure, provided is a method 200 for applying deep learning analysis to predict and automatically respond to predicted changes in financial device primacy for a financial device holder. Depicted are additional steps for execution by the processor after step 214, particularly including step 218, in which the processor determines one or more applicable issuer promotions from an issuer promotional campaign. This may be retrieved from a promotion database as configured prior by issuers. The offer may be applicable to the current primary financial device. At step 220, the processor may transmit at least one communication to the financial device holder, the communication including an offer and/or reward. For example, an offer may be a coupon for reduced cost of a future transactions, which may automatically be applied upon processing the future transaction. By way of further example, the reward may be a monetary reward, a coupon code transmitted to the financial device holder, and/or the like. The promotion may be related to the current primary financial device, to discourage the financial device holder from changing their primary financial device. The promotion may be related to another financial device, to encourage the financial device holder to change their primary financial device. It will be appreciated that many configurations are possible.

Figure 4:
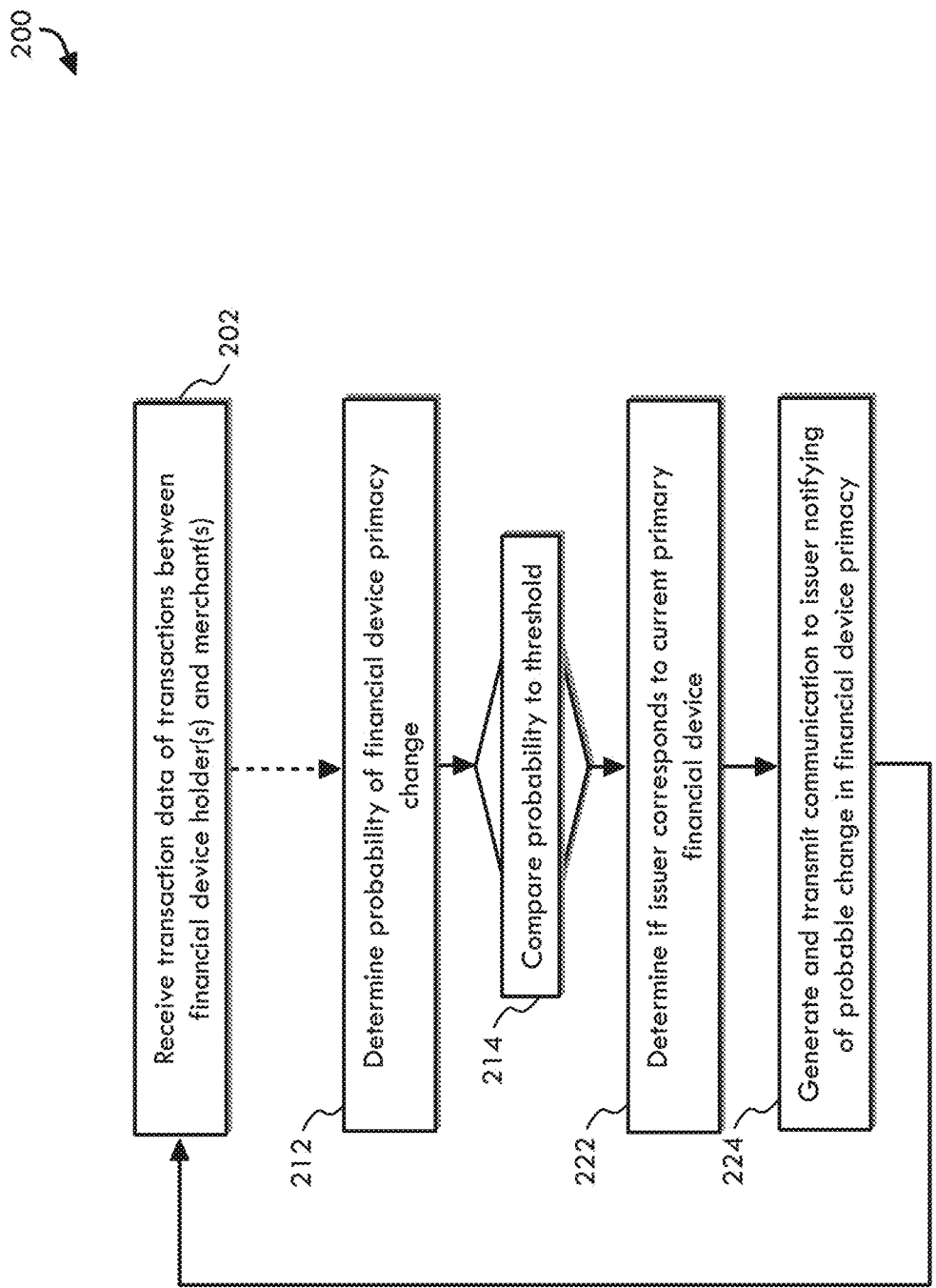
FIG. 4 is a flow diagram of one non-limiting embodiment or aspect of a system and method for applying deep learning analysis to predict and automatically respond to predicted changes in financial device primacy for a financial device holder.

With specific reference to FIGS. 2-4, and in particular reference to FIG. 4, in some non-limiting embodiments or aspects of the disclosure, provided is a method 200 for applying deep learning analysis to predict and automatically respond to predicted changes in financial device primacy for a financial device holder. Depicted are additional steps for execution by the processor after step 214, particularly including step 222, in which the processor determines if a stored issuer corresponds to the issuer of the current primary financial device. At step 224, the processor may generate and transmit a communication to an issuer notifying of a probable change in financial device primacy. For the issuer of the primary financial device, this communication would afford the issuer time to encourage the financial device holder not to change their primary financial device. For issuers of non-primary financial devices, this communication would afford the issuers time to further encourage the financial device holder to switch away from their current primary financial device. It will be appreciated that many configurations are possible.

Figure 5:
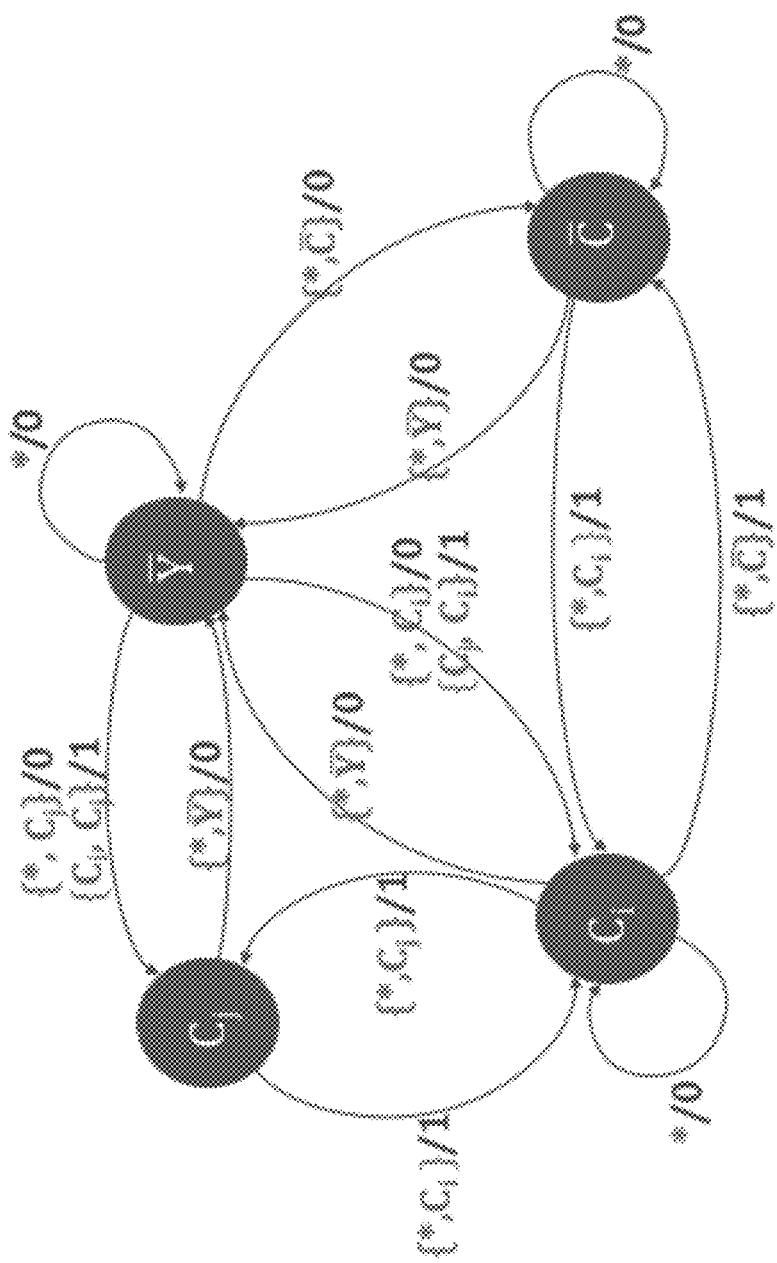
FIG. 5 is a state transition diagram of one non-limiting embodiment or aspect of a system and method for applying deep learning analysis to predict and automatically respond to predicted changes in financial device primacy for a financial device holder.

With specific reference to FIG. 5, and in some non-limiting embodiments or aspects of the disclosure, a change in primacy of a financial device from one time interval to the next may be represented using the principles of a finite state machine. For example, each cardholder U may complete n transactions (n≥0) in a sample time interval T, by using one or more of k number of financial devices C (represented as the set $\{C_1, C_2, \ldots C_k\}$). The same cardholder U may complete n' transactions (n'≥0) in a subsequent sample time interval T', using one or more of their financial devices ($\{C_1, C_2, \ldots C_k\}$). As may be defined in some non-limiting embodiments or aspects, there are four states in any given time interval: (1) there exists a primary financial device $C_i$ in the first interval T; (2) there exists a primary financial device $C_j$ in the second time interval T'; (3) there is no primary financial device $\overline{C}$ in a given time interval; (4) there are no transactions $\overline{Y}$ in a given time interval. These four states are represented by nodes in the depicted finite state machine diagram. In some non-limiting embodiments or aspects, there are three transitions between these states that may be deemed to be a change in financial device primacy: (1) the financial device holder transitions from primary financial device $C_i$ to primary financial device $C_j$, or vice versa; (2) the financial device holder transitions from primary financial device $C_i$ to having no primary financial device $\overline{C}$, or vice versa; (3) the financial device holder transitions from primary financial device $C_i$ to primary financial device $C_j$ through a period of no transactions $\overline{Y}$, or vice versa. Transitions between states from a first time interval (current state) to a second time interval (next state) are depicted in the finite state machine diagram as arrows between nodes. The transitions are labeled as "{input}/output". The "input" is represented by "{prior state, next state}", and the "output" is represented by either a "1" (representing a change in financial device primacy) or "0" (representing no change in financial device primacy). For example, the transition connecting current state $C_j$ to next state $C_i$ labeled "{*, $C_i$}/1" indicates that if the previous state was null (e.g., "*") and the next state is $C_j$, then there is a primacy change (e.g., "1"). By way of further example, the transition connecting current state $\overline{Y}$ to next state $C_j$ labeled "{$C_i$, $C_j$}/1" indicates that if the previous state was $C_i$ and the next state is $C_j$, then there is a change in primacy (e.g., "1"). This logic may be used to label the time series data with primacy changes from one time interval or subinterval to another.

Figure 6:
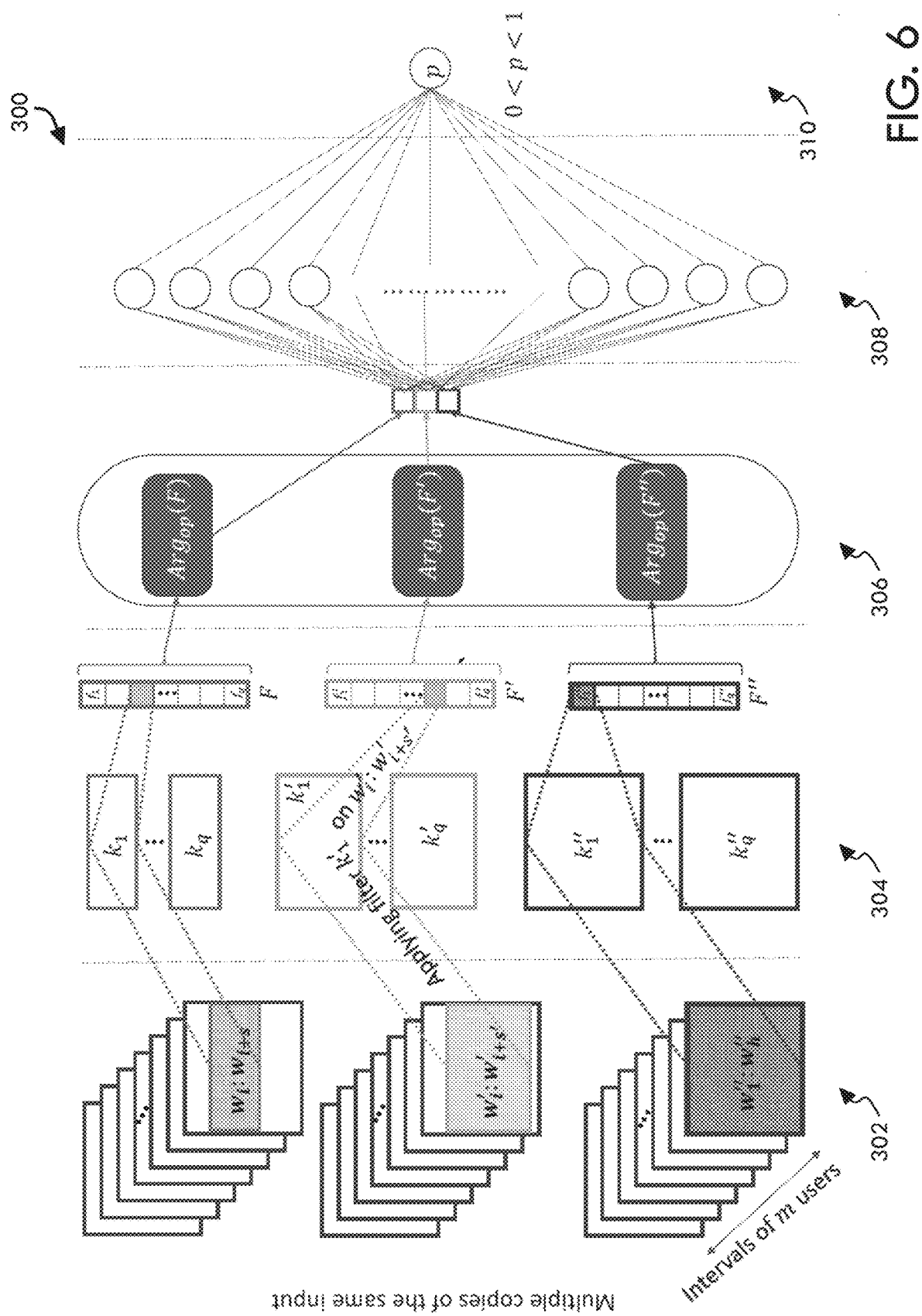
FIG. 6 is a schematic diagram of one non-limiting embodiment or aspect of a system and method for applying deep learning analysis to predict and automatically respond to predicted changes in financial device primacy for a financial device holder.

With specific reference to FIG. 6, and in some non-limiting embodiments or aspects of the disclosure, depicted is a schematic diagram of a neural network architecture 300 for a predictive model for predicting changes in financial device primacy. A recurrent neural network (RNN) may be used when analyzing sequential dependencies in data. Long short-term memory (LSTM), a class of RNN with sophisticated recurrent hidden and gated units, particularly may be applied to identify hidden long-term sequential dependencies. A convolutional neural network (CNN) may be used to extract features from raw time series data for activity/action recognition. As depicted in FIG. 6, a CNN may be employed as the based predictive model for analyzing time-series formatted transaction data. A CNN is made up of a number of algorithmic layers, including an input layer 302, a convolution layer 304, a pooling layer 306, a fully connected rectified linear unit (RELU) layer 308, and an output layer 310. The convolution layer 304 generalizes the input to extract repeated patterns. The pooling layer 306 determines the prominent information from the convolution output. The convolution layer 304 and pooling layer 306 may be repeated a number of times. The fully connected layer 308 identifies features within the processed data. Stacking the fully connected layers 308 helps the model make better decisions since each layer is utilized to identify hidden features.

With further reference to FIG. 6, and in some non-limiting embodiments or aspects, the following formula may represent an interval from a financial device holder's transaction activities:

$$I_i \in \mathbb{R}^{hw} \qquad \text{Formula 1}$$

where w is the width of interval $l_i$ determined from the number of statistical parameters (e.g., features) being analyzed, and where height h depends on the number of subintervals within the interval. For example, for a financial device holder whose transactions are being analyzed at a weekly resolution (e.g., subinterval is one week), if each interval contains 14 features per week and the financial device holder has transacted for a month (assuming 1 month=4 weeks), the dimensions of the interval for the financial device holder would be 4×14. In this model, padding is not needed to make the subintervals in the data map uniform, since all subintervals have the same size.

In view of this, each subinterval's feature vector may be represented as $w_i$. With this notation, an interval with m weeks may be represented as:

$$I_i \in w_1 \oplus w_2 \oplus \ldots \oplus w_m \qquad \text{Formula 2}$$

The symbol "$\oplus$" denotes concatenation of each week's feature vectors, e.g., parameters of weekly transaction activities, to represent the financial device holder's transaction history over the entire sample time period.

The input 302 to the CNN predictive model for determining a probability of financial device primacy change for a set of n users is a set of d intervals collected from the n users. The various layers of the CNN model may be applied for each of the d intervals of n users to produce a series of $p_n$ probabilities. The d intervals form the input layer 302. From the input layer 302, a convolution operation is applied. The convolution layer 304 consists of multiple kernels k with varied sizes. Each kernel k with size s×w is applied to a subinterval that contains s weeks, represented as:

$$w_i : w_{i+s} \qquad \text{Formula 3}$$

From this, we may represent a new feature $f_i$ using the following expression:

$$f_i = C(k \cdot w_i : w_{i+s} + b) \qquad \text{Formula 4}$$

Based on this expression, first, the dot product of kernel k and weeks $w_i$ to $w_{i+s}$ is calculated. Then, the result is added up with b, the bias term. Finally, a non-linear function C, such as RELU, is applied. The whole operation is applied to an interval (h−s+1) times, and generates the feature map F:

$$F = \{f_1, f_2, \ldots f_{h-s+1}\} \qquad \text{Formula 5}$$

The next layer of the CNN model is the pooling layer 306. The main task of the pooling layer 306 is capturing prominent feature(s) from a feature map. The pooling operation can be applied in two different approaches: global or local. A global pooling operation acts as an aggregate function and converts a feature map to a value:

$$v = \text{Arg}_{op}(\{f_1, f_2, \ldots f_{n-s+1}\}) \qquad \text{Formula 6}$$

Depending on the domain of an application, either maximum functions or averaging functions may be used as an operator (op). A local pooling operation slides through a feature map and aggregates m values of each window to produce a set of values v as set forth by the following formula:

$$v = \{\text{Arg}_{op}(\{f_i : f_{i+m}\}) \oplus \ldots \oplus \text{Arg}_{op}(\{f_{h-s+1-m} : f_{h-s+1}\})\} \qquad \text{Formula 7}$$

Applying all filters and concatenating new extracted features results in a one-dimensional array, called V. This is the input to the next layer, which is a full connected RELU layer 308, to which a softmax squashing function may be applied, shown generally below:

$$\sigma(z)_j = \frac{e^{z_j}}{\sum_{k=1}^{K} e^{z_k}} \qquad \text{Formula 8}$$

where z is a vector of the inputs to the output layer 310, with j indexes of the output units. The output of softmax function, which include values between 0 and 1, passes to the final output layer 310 and gives a probability p. When building the neural network predictive model based on historic data, p can be compared to a known (or predetermined label) value of 0 or 1 to calculate an error rate. Based on this comparison, the model may update network parameters including weights and biases of the convolution layers. When creating the initial predictive model, the parameters and biases may be initiated randomly and adjusted/learned through successive iterations. This provides the benefit of a self-improving predictive model.

Figure 7:
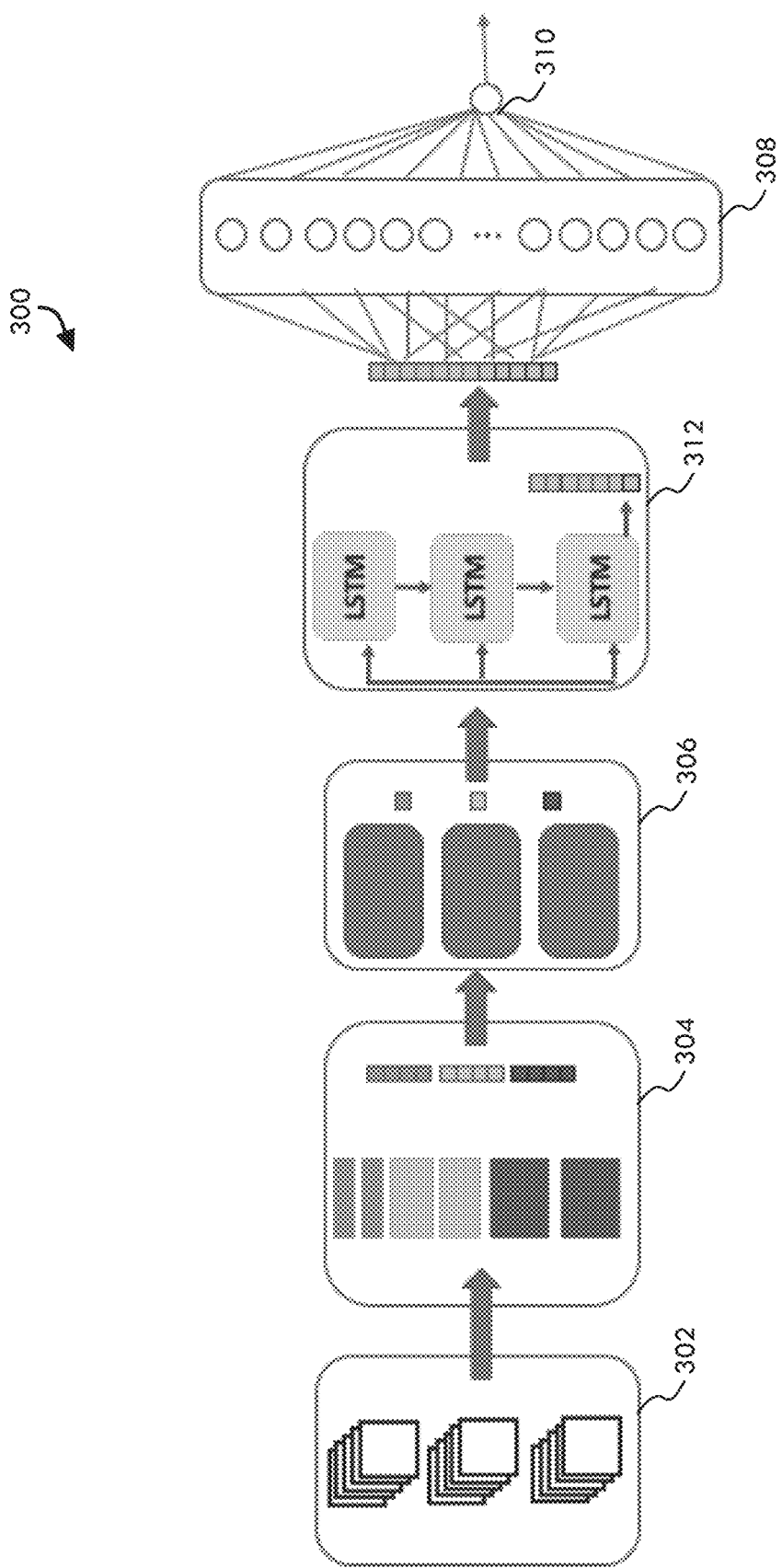
FIG. 7 is a schematic diagram of one non-limiting embodiment or aspect of a system and method for applying deep learning analysis to predict and automatically respond to predicted changes in financial device primacy for a financial device holder.

With specific reference to FIG. 7, and in some non-limiting embodiments or aspects, the CNN predictive model architecture 300 may be reconfigured to pass the one-dimensional extracted feature array V to an LSTM layer 312 instead of the fully-connected RELU layer 308. LSTM may be used to aggregate the temporal aspects in the features learned from the convolutional network. LSTM takes input in the form of a sequence to compute a hidden vector sequence and an output vector by iterating the following equations from t=1 to H:

$$h_t = H\{W_{vh}v_t + W_{hh}h_{t-1} + b_h\} \qquad \text{Formula 9}$$

$$o_t = H\{W_{ho}h_t + b_y\} \qquad \text{Formula 10}$$

where the W terms denote weight matrices, b terms denote bias vectors, and H is the hidden layer function. FIG. 7 depicts this CNN-LSTM predictive model architecture.

Although the disclosure has been described in detail for the purpose of illustration based on what is currently considered to be the most practical and preferred and non-limiting embodiments or aspects, it is to be understood that such detail is solely for that purpose and that the disclosure is not limited to the disclosed embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
generating, with at least one processor, a predictive convolutional neural network (CNN) model configured to:
receive an input of time-interval-based transaction data; and
output a probability of a primary financial device primacy change, wherein a financial device with primacy is used more frequently than other financial devices of a financial device holder, and wherein a primacy change comprises one of the following events: the financial device holder has a financial device with primacy in a first time interval and does not have a financial device with primacy in a second time interval, the financial device holder does not have a financial device with primacy in the first time interval and has a financial device with primacy in the second time interval, or the financial device holder has a financial device with primacy in the first time interval and has a different financial device with primacy in the second time interval;
training, with at least one processor, the predictive CNN model based on historic transaction data;

determining, with at least one processor, a first probability of a primary financial device primacy change for the financial device holder using the predictive CNN model and an input based on transaction data representative of a plurality of transactions between the financial device holder and at least one merchant over the first time interval;

receiving, with at least one processor, new transaction data representative of a plurality of transactions between the financial device holder and at least one merchant over the second time interval;

update the predictive CNN model in the second time interval at least partially based on the first probability of the primary financial device primacy change, to produce an updated version of the predictive CNN model; and determining, with at least one processor, a second probability of a primary financial device primacy change for the financial device holder using the updated version of the predictive CNN model and an input based on the new transaction data.

2. The method of claim 1, further comprising:
transmitting, with at least one processor and based at least partially on the second probability of the primary financial device primacy change for the financial device holder, at least one of the following: (i) at least one communication to at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

3. The method of claim 2, further comprising:
determining, with at least one processor, one or more applicable issuer promotions for a current primary financial device of the financial device holder by retrieving issuer promotion data from an issuer promotion database; and
transmitting, with at least one processor, the at least one communication to the financial device holder, the at least one communication comprising the one or more applicable issuer promotions for the current primary financial device to discourage the financial device holder from changing their primary financial device.

4. The method of claim 2, further comprising storing, in a database, financial device data of a current primary financial device of the financial device holder for the first time interval in association with issuer correspondence data.

5. The method of claim 4, further comprising transmitting, with at least one processor and based at least partially on the issuer correspondence data, the at least one communication to the at least one issuer, wherein the at least one issuer comprises an issuer of the current primary financial device, and wherein the at least one communication indicates that the financial device holder is likely to have a new primary financial device in a subsequent time interval.

6. The method of claim 4, further comprising, in response to determining that the second probability of the primary financial device primacy change for the financial device holder is more likely than not:
transmitting, with at least one processor and based at least partially on the issuer correspondence data, the at least one communication to the at least one issuer, wherein the at least one issuer comprises an issuer of a non-primary financial device, and wherein the at least one communication indicates that the financial device holder may have a new primary financial device in a subsequent time interval.

7. The method of claim 2, further comprising storing, in a database, financial device data of a current primary financial device of the financial device holder for the first time interval in association with financial device holder correspondence data.

8. The method of claim 7, further comprising, in response to detecting a transaction request for the primary financial device, transmitting, with at least one processor and based at least partially on the financial device holder correspondence data, the at least one communication to the financial device holder, the at least one communication comprising an offer or reward.

9. The method of claim 1, wherein primary financial device primacy is defined by a ratio of a number of transactions for a given financial device over a total number of transactions for the financial device holder being greater than or equal to a predefined value greater than 0.6.

10. A system comprising at least one server computer comprising at least one processor, the at least one server computer programmed and/or configured to:
generate a predictive convolutional neural network (CNN) model configured to:
receive an input of time-interval-based transaction data; and
output a probability of a primary financial device primacy change, wherein a financial device with primacy is used more frequently than other financial devices of a financial device holder, and wherein a primacy change comprises one of the following events: the financial device holder has a financial device with primacy in a first time interval and does not have a financial device with primacy in a second time interval, the financial device holder does not have a financial device with primacy in the first time interval and has a financial device with primacy in the second time interval, or the financial device holder has a financial device with primacy in the first time interval and has a different financial device with primacy in the second time interval;
train the predictive CNN model based on historic transaction data;
determine a first probability of a primary financial device primacy change for the financial device holder using the predictive CNN model and an input based on transaction data representative of a plurality of transactions between the financial device holder and at least one merchant over the first time interval;
receive new transaction data representative of a plurality of transactions between the financial device holder and at least one merchant over the second time interval;
update the predictive CNN model in the second time interval at least partially based on the first probability of the primary financial device primacy change, to produce an updated version of the predictive CNN model; and
determine a second probability of a primary financial device primacy change for the financial device holder using the updated version of the predictive CNN model and an input based on the new transaction data.

11. The system of claim 10, wherein the at least one server computer is further programmed and/or configured to:
transmit, based at least partially on the second probability of the primary financial device primacy change for the financial device holder, at least one of the following: (i)

at least one communication to at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

12. The system of claim 11, wherein the at least one server computer is further programmed and/or configured to:
determine one or more applicable issuer promotions for a current primary financial device of the financial device holder by retrieving issuer promotion data from an issuer promotion database; and
transmit the at least one communication to the financial device holder, the at least one communication comprising the one or more applicable issuer promotions for the current primary financial device to discourage the financial device holder from changing their primary financial device.

13. The system of claim 11, wherein the at least one server computer is further programmed and/or configured to store, in a database, financial device data of a current primary financial device of the financial device holder for the first time interval in association with issuer correspondence data.

14. The system of claim 13, wherein the at least one server computer is further programmed and/or configured to transmit, based at least partially on the issuer correspondence data, the at least one communication to the at least one issuer, wherein the at least one issuer comprises an issuer of the current primary financial device, and wherein the at least one communication indicates that the financial device holder is likely to have a new primary financial device in a subsequent time interval.

15. The system of claim 13, wherein the at least one server computer is further programmed and/or configured to, in response to determining that the second probability of the primary financial device primacy change for the financial device holder is more likely than not:
transmit, based at least partially on the issuer correspondence data, the at least one communication to the at least one issuer, wherein the at least one issuer comprises an issuer of a non-primary financial device, and wherein the at least one communication indicates that the financial device holder may have a new primary financial device in a subsequent time interval.

16. The system of claim 11, wherein the at least one server computer is further programmed and/or configured to store, in a database, financial device data of a current primary financial device of the financial device holder for the first time interval in association with financial device holder correspondence data.

17. The system of claim 16, wherein the at least one server computer is further programmed and/or configured to, in response to detecting a transaction request for the primary financial device, transmit, based at least partially on the financial device holder correspondence data, the at least one communication to the financial device holder, the at least one communication comprising an offer or reward.

18. The system of claim 10, wherein primary financial device primacy is defined by a ratio of a number of transactions for a given financial device over a total number of transactions for a financial device holder being greater than or equal to a predefined value greater than 0.6.

19. A computer program product comprising at least one non-transitory computer-readable medium comprising instructions that, when executed by at least one processor, cause the at least one processor to:
generate a predictive convolutional neural network (CNN) model configured to:
receive an input of time-interval-based transaction data; and
output a probability of a primary financial device primacy change, wherein a financial device with primacy is used more frequently than other financial devices of a financial device holder, and wherein a primacy change comprises one of the following events: the financial device holder has a financial device with primacy in a first time interval and does not have a financial device with primacy in a second time interval, the financial device holder does not have a financial device with primacy in the first time interval and has a financial device with primacy in the second time interval, or the financial device holder has a financial device with primacy in the first time interval and has a different financial device with primacy in the second time interval;
train the predictive CNN model based on historic transaction data;
determine a first probability of a primary financial device primacy change for the financial device holder using the predictive CNN model and an input based on transaction data representative of a plurality of transactions between the financial device holder and at least one merchant over the first time interval;
receive new transaction data representative of a plurality of transactions between the financial device holder and at least one merchant over the second time interval;
update the predictive CNN model in the second time interval at least partially based on the first probability of the primary financial device primacy change, to produce an updated version of the predictive CNN model; and
determine a second probability of a primary financial device primacy change for the financial device holder using the updated version of the predictive CNN model and an input based on the new transaction data.

20. The computer program product of claim 19, wherein the instructions further cause that least one processor to:
transmit, based at least partially on the second probability of the primary financial device primacy change for the financial device holder, at least one of the following: (i) at least one communication to at least one issuer indicating a likelihood of the financial device holder changing their primary financial device; (ii) the at least one communication to the financial device holder to discourage the financial device holder from changing their primary financial device or encourage the financial device holder to change their primary financial device; or (iii) any combination thereof.

\* \* \* \* \*